United States Patent [19]
Matsumoto et al.

[11] Patent Number: 5,909,101
[45] Date of Patent: Jun. 1, 1999

[54] BATTERY CHARGER DETECTING FULL CHARGE OF BATTERIES USING A THERMOSTAT AND THERMISTOR IN A BATTERY PACK

[75] Inventors: Toshio Matsumoto; Hideki Watanabe; Toshiyasu Kasuya; Tatsuki Mori, all of Anjo, Japan

[73] Assignee: Makita Corporation, Aichi-ken, Japan

[21] Appl. No.: 08/835,021

[22] Filed: Mar. 27, 1997

[30] Foreign Application Priority Data

Mar. 27, 1996 [JP] Japan .................................. 8-099034

[51] Int. Cl.⁶ .................................................. H01M 10/46
[52] U.S. Cl. ............................................. 320/110; 320/150
[58] Field of Search ..................................... 320/110, 112, 320/119, 123, 125, 150, 154, FOR 134, FOR 105

[56] References Cited

U.S. PATENT DOCUMENTS

| | | |
|---|---|---|
| 4,114,083 | 9/1978 | Benham . |
| 4,528,492 | 7/1985 | Inaniwa et al. . |
| 4,623,832 | 11/1986 | Fujiwara . |
| 4,636,704 | 1/1987 | Nakai . |
| 4,680,527 | 7/1987 | Benenati et al. ......................... 320/112 |
| 4,829,226 | 5/1989 | Nakamura et al. ...................... 320/112 |
| 4,853,607 | 8/1989 | Walter et al. . |
| 5,013,993 | 5/1991 | Bhagwat et al. . |
| 5,089,765 | 2/1992 | Yamaguchi . |
| 5,289,101 | 2/1994 | Furuta et al. . |
| 5,410,238 | 4/1995 | Ishizuka et al. . |
| 5,519,302 | 5/1996 | Mino et al. ............................. 320/148 |
| 5,519,303 | 5/1996 | Goedken et al. ....................... 320/150 |
| 5,576,611 | 11/1996 | Yoshida ................................. 320/152 |
| 5,652,500 | 7/1997 | Kadovchi et al. ..................... 320/150 |

FOREIGN PATENT DOCUMENTS

| | | |
|---|---|---|
| 33 40 944 A1 | 5/1984 | Germany . |
| 43 12 572 A1 | 10/1994 | Germany . |
| 195 21 962 A1 | 1/1996 | Germany . |
| 195 30 849 A1 | 3/1996 | Germany . |

*Primary Examiner*—Edward H. Tso
*Attorney, Agent, or Firm*—Pillsbury Madison & Sutro LLP

[57] ABSTRACT

A battery charging system is disclosed for charging two different types of battery packs, a known three terminal type including batteries and a thermostat switch, and a newer four terminal type further including a thermistor for sensing battery temperature. A charging control circuit stops charging current to the battery pack when a contact of the thermostat switch is open or when the thermistor detects a temperature above a predetermined temperature. If either the thermostat switch or the thermistor fail to properly operate, charging current to the battery pack is stopped securely to avoid damaging batteries.

3 Claims, 9 Drawing Sheets

BATTERY CHARGER DETECTING FULL CHARGE OF BATTERIES USING A THERMOSTAT AND THERMISTOR IN A BATTERY PACK

BACKGROUND OF THE INVENTION

1. Field of the Invention

This invention relates generally to a battery charger of a storage battery pack. More specifically, it relates to a battery charger which detects the full charge of a storage batteries. By using a thermostat and a thermistor built into the storage battery pack.

2. Description of Related Art

A storage battery which can be used to power an electromotive tool is repeatedly used. It is known to rapidly charge such a battery by flowing a large current through it. Battery chargers for doing so are known. Such battery chargers detect a full charge of the storage battery by various methods. One type of detector uses a thermostat for detecting the full charge.

Figure 2:
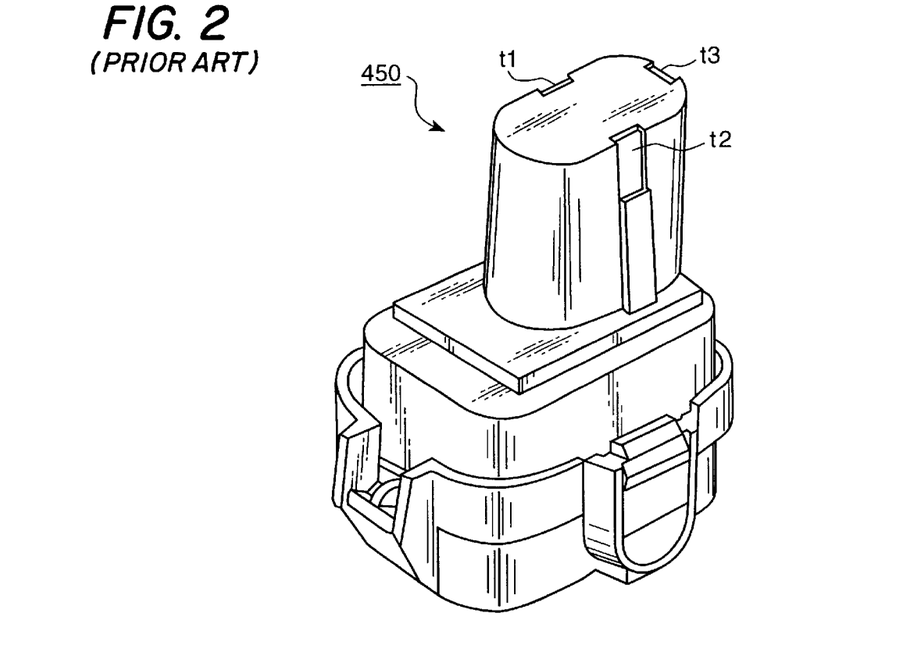
FIG. 2 (Prior Art) is a perspective view of an existing storage battery pack.
Figure 11:
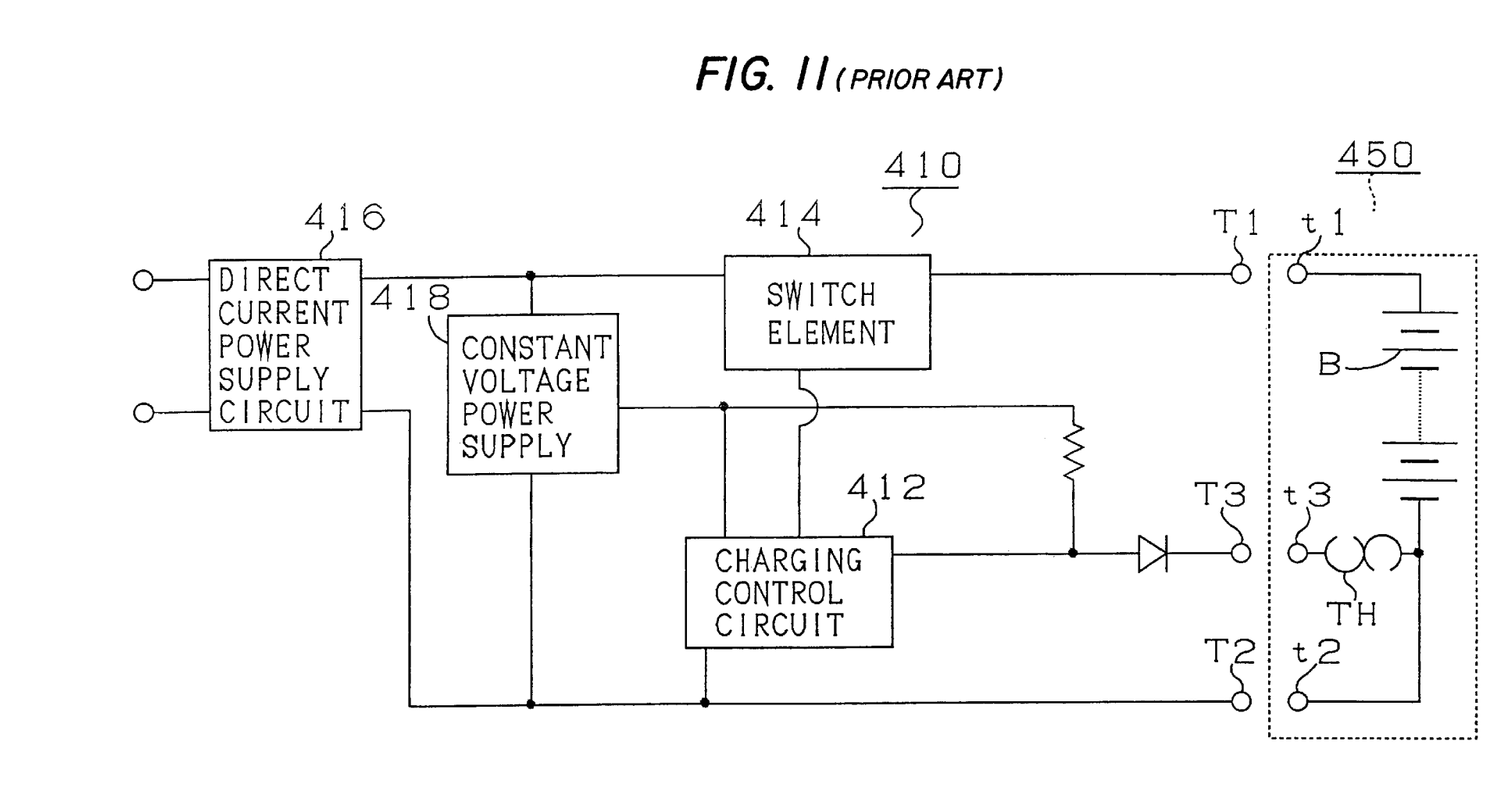
FIG. 11 (Prior Art) is a schematic block diagram showing an existing battery charger and storage battery pack.

An example of a battery charger which uses the thermostat will now be explained with referring to FIG. 11 and FIG. 2. A storage battery pack 450 shown in FIG. 2 has a plural storage batteries B shown in FIG. 11, and a thermostat TH which opens at a predetermined temperature due to completion of charging of the storage batteries B, and a first, a second, a third input terminals t1, t2, t3, as shown in FIG. 11. battery charger 410 includes a direct current circuit 416 which rectifies commercially available AC power into direct current, a charging control circuit 412 that monitors the open/closed status of the thermostat TH, a constant voltage power supply 418 which supplies electric power to the charging control circuit 412, and a switch element 414 which stops the charge when the charging control circuit 412 detects that thermostat TH is open as a result of full charging of the storage batteries B.

A problem associated with the operation of this circuit is that when first input terminal t1 comes into contact with third input terminal t3 during a use, thermostat TH may break down and will no longer function properly. The circuit is subject to failure in another manner as well. When the storage battery pack 450 is used in a device which causes it to shake such as in an electromotive style tool, thermostat TH sometimes suffers a mechanical breakdown. When thermostat TH fails to operate properly, the charging completion of the storage batteries B is not detected, and the life time of the storage batteries B may became short due to improper charging.

It is accordingly an object of the present invention to provide a battery charger which can detect the completion of charging of a storage battery pack surely and accurately.

Further, an object of the present invention is to provide a battery charger which can charge a storage battery pack only under a low temperature.

SUMMARY OF THE INVENTION

The present invention provides a charging arrangement that stops charge current flow to a battery pack being charged, due to the high temperature detection by the temperature sensor or the opening of the switch by the high temperature detection of a temperature switch. Therefore, even if an obstacle occurs in the temperature switch, the charge current to the secondary battery pack can be stopped securely.

Charging control means causes charge current to flow through the temperature switch to the secondary battery. Therefore, even if an obstacle occurs in the temperature sensor, the temperature switch stops the charge current to the secondary battery. Thus, a continuous charge to the secondary battery pack of which the charge is completed can be prevented.

When the charging control means charges the first secondary battery pack through the first terminal and the third terminal, the charging control means stops the charge current based on an open due to the high temperature detection of the thermostat via the second terminal, or based on the change of the resistance value due to the high temperature detection of the thermistor via the fourth terminal.

When charging control means charges the second secondary battery pack through the first terminal and the third terminal, the charging control means stops the charge current based on the open due to the high temperature detection of the thermostat via the second terminal. Therefore, the first secondary battery pack which has the first to the fourth terminals, and, the second secondary battery pack which has the first to the third terminals can be charged and stopped to charge.

The charging control means starts a charge to the secondary battery pack based on close of the switch by which the temperature switch detects the charge-able temperature, and, based on the detection of the charge-able temperature by the temperature sensor. Therefore, even if a temperature switch breaks down, it can be prevented to start a charge of the secondary battery pack at high temperature.

The charging control means indicates the wrong point of the secondary battery through the unusual indication means, when the close of the temperature switch and the detection of the high temperature by the temperature sensor are occurred at the same time. Therefore, a secondary battery pack having a defected temperature switch can be indicated.

BRIEF DESCRIPTION OF THE DRAWINGS

The present invention is illustrated in the accompany drawings, in which.

DETAILED DESCRIPTION OF THE PREFERRED EMBODIMENTS

Embodiments of this invention will now be described in detail with reference to the accompanying drawings.

Figure 1:
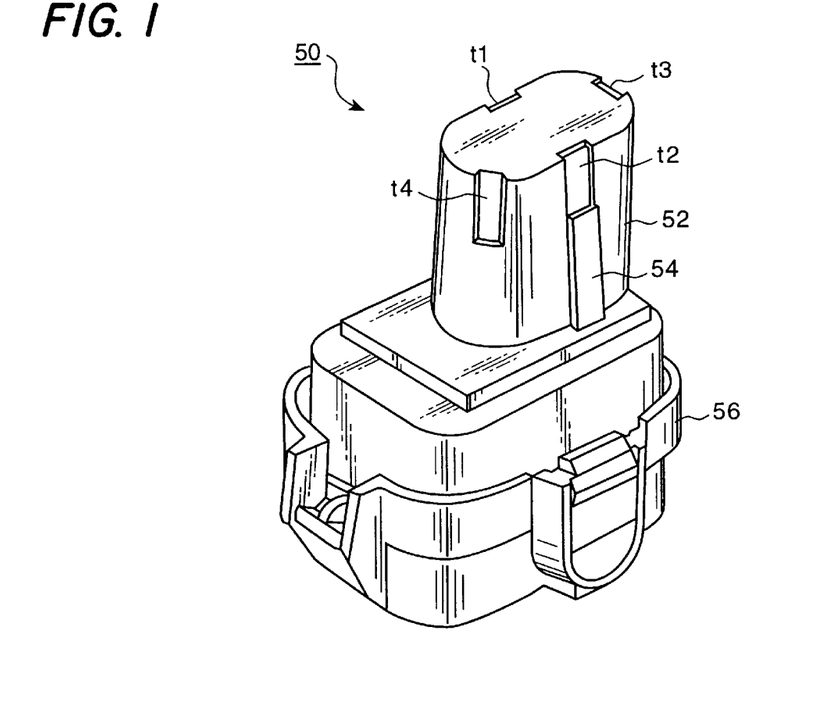
FIG. 1 is a perspective view of a storage battery pack according to embodiments of this invention.
Figure 3:
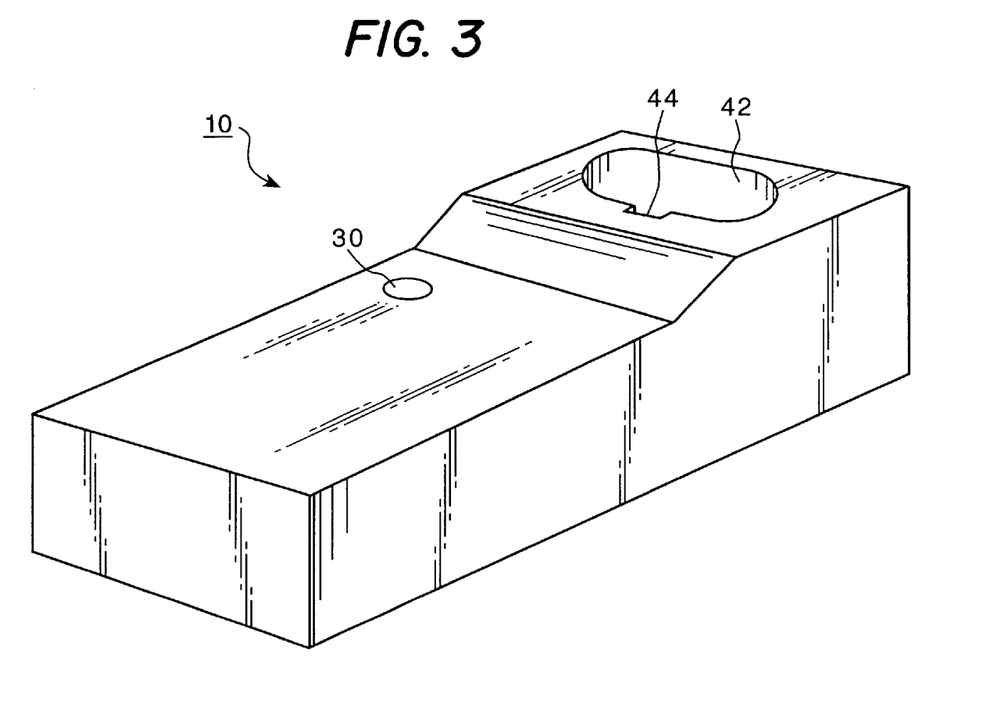
FIG. 3 is a perspective view of a battery charger according to embodiments of this invention.
Figure 4:
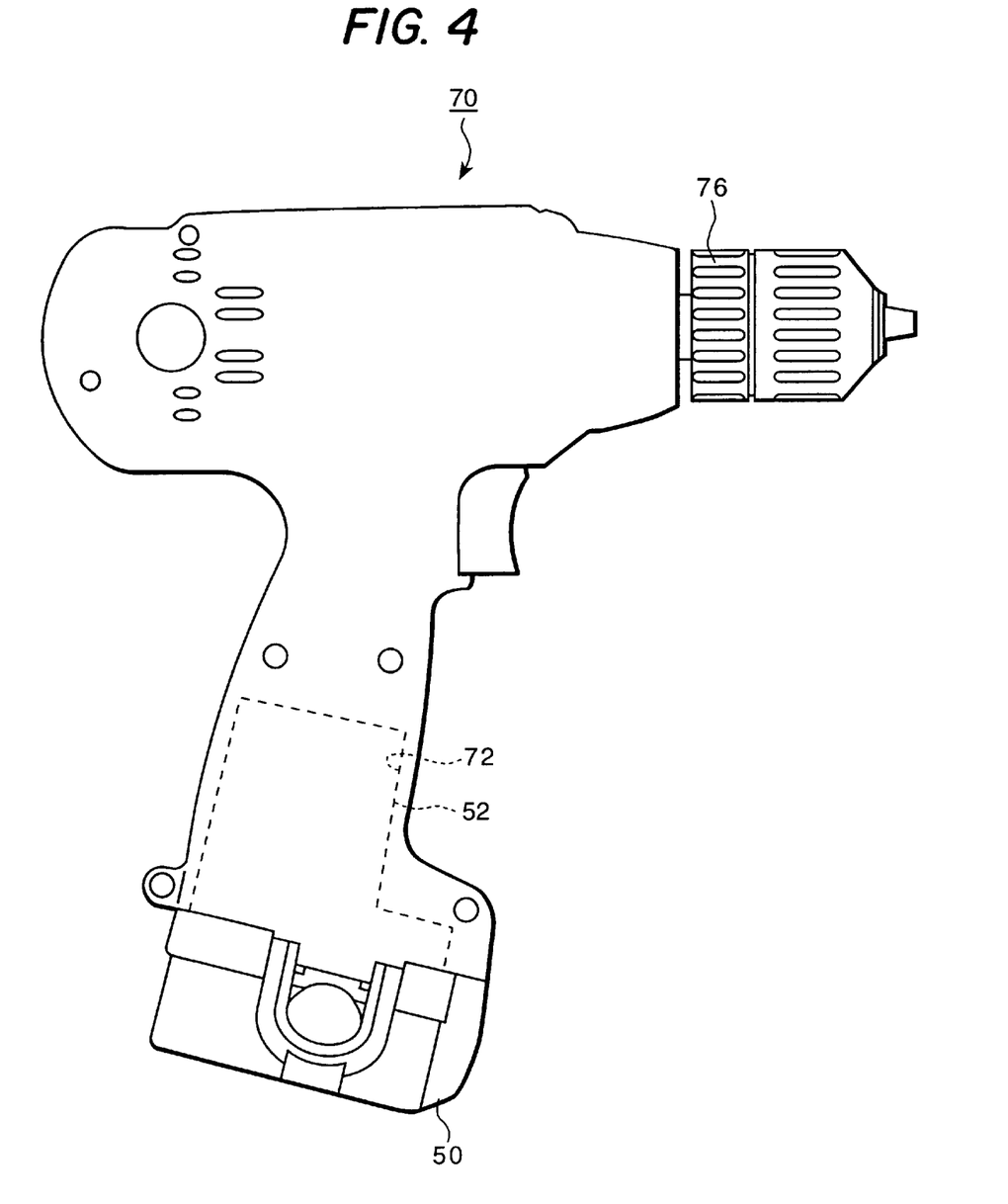
FIG. 4 is a perspective view of an electromotive drill using the storage battery pack shown in FIG. 1.

FIG. 1 shows a storage battery pack 50 according to a first embodiment of this invention. FIG. 3 shows a battery charger 10 which charges a battery in storage battery pack 50. FIG. 4 shows a electromotive drill 70 powered by storage battery pack 50. Of course the drill is merely exemplary. The invention is not limited to use with a power drill, but rather can be advantageously utilized with a variety of battery powered devices.

As shown in FIG. 1, storage battery pack 50 contains a storage battery (not visible in the figure). Battery pack 50 has a generally cylinder-shaped inserting part 52 and a pillar-shaped base part 56. A key-shaped key part 54 is formed at the side of the inserting part 52. At the top of inserting part 52, there is a first input terminal t1 which is internally connected to a positive terminal of the storage battery (not visible). A second input terminal t2 is internally connected to a negative terminal of the storage battery. A third input terminal t3 is connected to the negative terminal of the battery through a thermostat (not visible). A fourth input terminal t4 is connected to the negative terminal of the battery through a thermistor (not visible).

As shown in FIG. 3, the battery charger 10 which charges the storage battery pack 50 has an inserting hole 42 for receiving the inserting part 52 of the storage battery pack 50. A key groove 44 is formed at the side wall of the inserting hole 42 for receiving key part 54 of battery pack 50. The use of key part 54 on storage battery pack 50 which mates with key groove 44 on inserting hole 42 of battery charger 10, the battery pack can only be installed in the correct way into the charger. In a bottom part of inserting hole 42 there are first to fourth output terminals T1, T2, T3, T4 (not shown in FIG. 3) which contact the first to fourth terminals t1 t2, t3, t4, respectively, of storage battery pack 50. A LED lamp 30 indicates a charging condition and the quality of a storage battery pack installed in battery charger 10.

As shown in FIG. 4, electromotive drill 70 has an inserting hole 72 for receiving the inserting part 52 of the storage battery pack 50. Electric current generated by battery pack 50, flowing via terminals t1 and t2, powers a motor (not shown) which, in turn, drives drill chuck 76. Drill 70 can be used continuously by exchanging battery packs 50, as needed. The battery charger 10 can rapidly charge a 'used' storage battery pack 50 in about 60 minutes.

Figure 5:
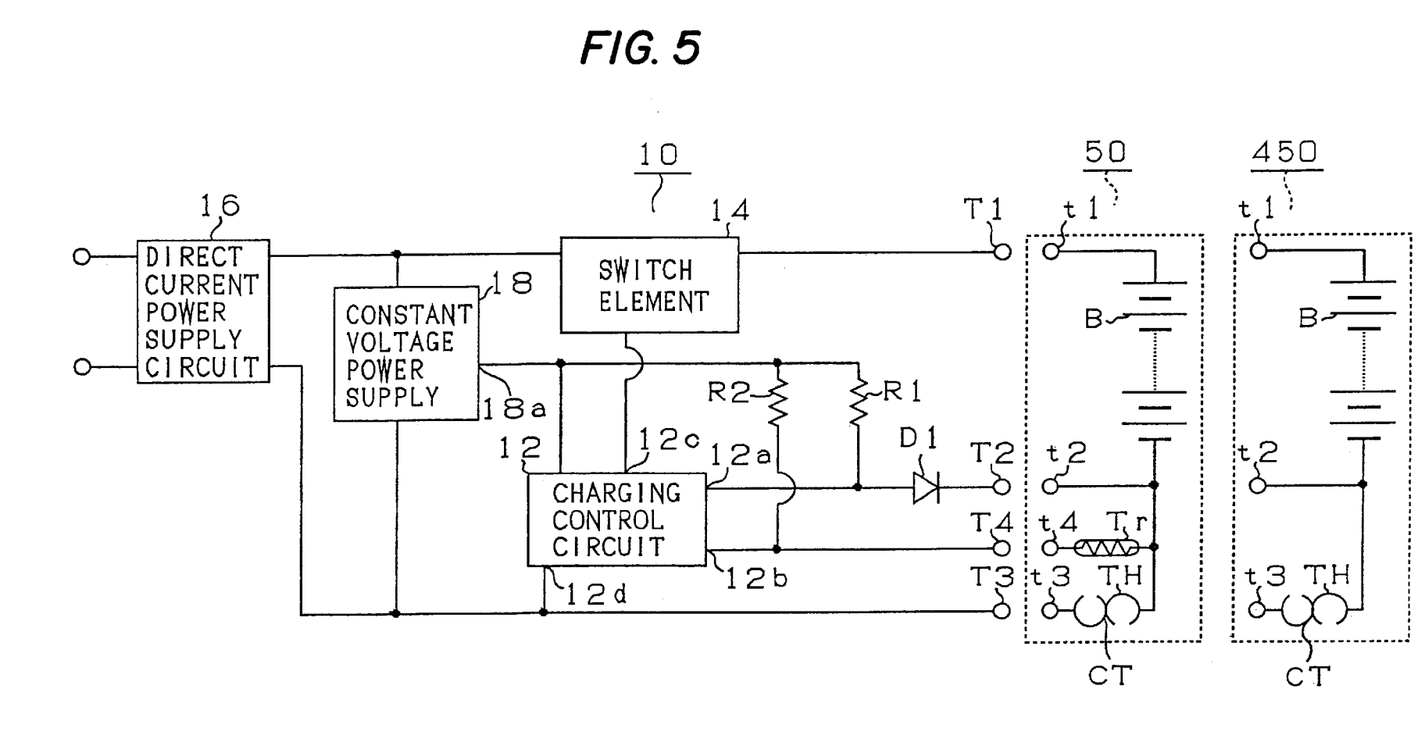
FIG. 5 is a schematic block diagram showing a battery charger and a storage battery pack according to a first embodiment.

FIG. 5 is a schematic diagram of the charging circuit of battery charger 10, along with a schematic diagram of battery pack 50 and a prior art battery pack 450 for easy comparison.

Storage battery pack 50 includes eight (8) Ni—Cd storage batteries B, which generate about 9.6V, a thermostat TH, which corresponds to a temperature switch which opens a contact CT when the thermostat senses a predetermined temperature due to completion of charging of storage batteries B, and negative characteristic thermistor Tr—corresponding to a temperature sensor—which senses a predetermined temperature due to completion of charging of storage batteries B.

Input terminal t1 of storage battery pack 50 is connected to the positive terminal of a series connection of storage batteries B. Input terminal t2 is connected to the negative terminal of the series connected storage batteries B. Input terminal t3 is connected to the negative terminal of storage batteries B through the thermostat TH, and input terminal t4 is connected to the negative terminal of storage batteries B through the thermistor Tr.

The battery charger 10 includes a direct current power supply circuit 16 which rectifies commercial electric AC power (110V) to direct current of 20V and applies positive voltage to first output terminal T1 and negative voltage to third output terminal T3. A charging control circuit 12, having terminals 12a, 12b, 12c, and 12d, monitors the opening and closing of the thermostat TH and a resistance of thermistor Tr. A constant voltage power supply 18 having three terminals, including terminal 18a, regulates power supplied to charging control circuit 12. A switch element 14, which can be a transistor, FET, or equivalent device, starts and stops charging based on a control signal from charging control circuit 12.

A voltage of about 5V from an output terminal 18a of constant voltage supply 18 is supplied to resistors R1 and R2, and to charging control circuit 12. Resistor R1 is connected through a reverse blocking diode D1 to output terminal T2. An anode of diode D1 is connected to a first input terminal 12a of the charging control circuit 12. Therefore, when contact CT of thermostat TH is closed during charging, current flows through resistance R1 and diode D1 to provide a low voltage level to input terminal 12a of the charging control circuit 12. However, when storage batteries B of the storage battery pack 50 become fully charged, and thermostat TH opens due to the heat generated by batteries B, current flow is stopped, and a higher voltage signal is applied to input terminal 12a of the charging control circuit 12.

Resistor R2 is connected to thermistor Tr through output terminal T4 and input terminal t4. Output terminal T4 is connected to input terminal 12b of the charging control circuit 12. When thermistor Tr is a high resistance (several K ohms) during charging, relatively high electric potential divided by the thermistor Tr and the resistance R2 is applied to second input terminal 12b of the charging control circuit 12. When batteries B become fully charged and thermistor Tr becomes low resistance (a number K ohms) due to the heat generated by batteries B, relative low electric potential is applied to the second input terminal 12b. Further, the charging control circuit 12 detects whether a storage battery pack 50 was attached into the battery charger 10 by a detection device (not shown).

Figure 8:
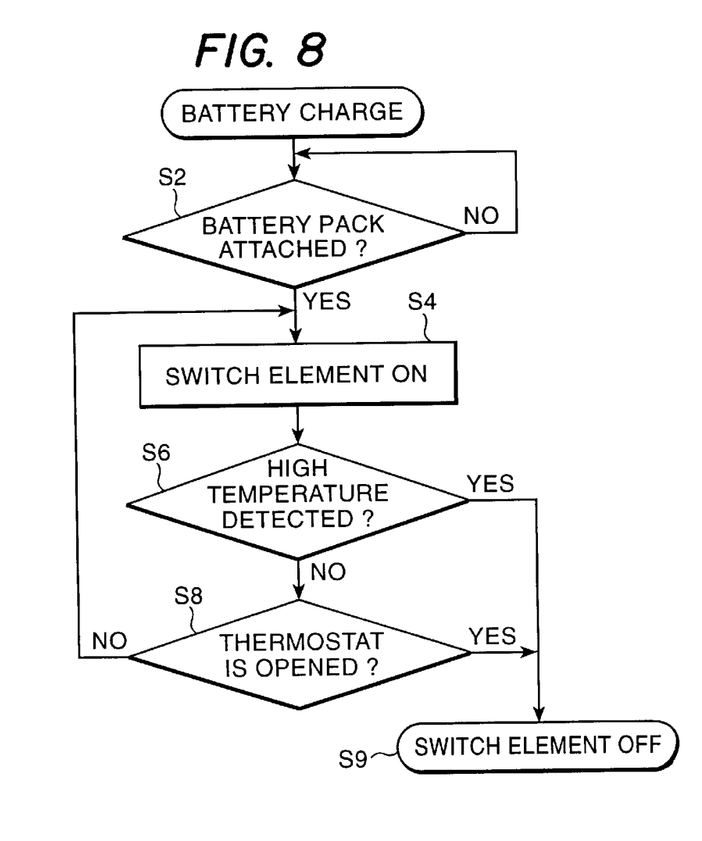
FIG. 8 is a flow chart showing an operation of a battery charger according to the first embodiment.

Operation of charging control circuit 12 will be explained with reference to the flow chart of FIG. 8. At step S2, the charging control circuit 12 detects whether a storage battery pack is attached to battery charger 10 by the detection device. If the pack 50 is attached, the control circuit 12 turns on switch element 14, and applies the electric potential via terminal T1 to the storage battery pack 50 to start the charge, at step S4. The control circuit 12 detects a high temperature by thermistor Tr, at step S6. If it doesn't detect and the relative high electric potential is applied at input terminal 12b, at step S8, the control circuit 12 checks whether thermostat TH opens. As long as thermostat TH doesn't become open and the low level signal is applied to terminal 12a, charging continues.

When storage batteries B generate heat due to completion of charging, and a detected temperature by the thermistor Tr becomes more than 60° C., the low voltage signal is applied to terminal 12b, thus the control circuit detects a high temperature, at step S6. Control transfers to step S9. Switch element 14 is tuned OFF, and current to the storage battery pack 50 is interrupted, thus charging is completed. In the same way, when a storage batteries B generate heat above 60° C. and thermostat TH opens, control circuit detects the open of thermostat TH by applying the high voltage signal to input terminal 12a, at step S8. Control transfers to step S9. The switch element 14 is turned OFF.

Operation of battery charger 10 with prior art storage battery pack 450 having three terminals will also be explained with reference to FIG. 5. Battery charger 10 can charge not only storage battery pack 50 having four terminals but also the existing storage battery pack 450 having three terminals. Thus, the present invention is compatible with older style battery packs. Battery charger 10 applies positive voltage to input terminal t1 of the storage battery pack 450 through output terminal T1, and applies negative voltage from output terminal T4 to input terminal t3 which is utilized for detecting the open/close state of thermostat TH of the storage battery pack 450. Battery charger 10 detects the open/closed state of thermostat TH via second input terminal t2 which applies negative voltage to the storage battery pack 450 through output terminal T2.

Operation of charging control circuit 12 with storage battery pack 450 having three terminals will be explained with referring to FIG. 8. At step S2, charging control circuit 12 detects whether a storage battery pack is attached into the battery charger 10. If, the pack 450 is attached, the control circuit 12 turns on switch element 14, and applies the electric potential via output terminal T1 to the storage battery pack 450 to start charging, at step S4. At step S8, the control circuit 12 checks whether thermostat TH is open. As long as thermostat TH doesn't become open and the low level signal is applied to input terminal 12a, the charging continues. Note that storage battery pack 450 does not have a fourth output terminal T4. Therefore, the relatively high electric potential is applied to input terminal 12b, in the same way when thermistor Tr is at a high resistance value due to the low temperature.

When storage batteries B generates the heat above 60° C. due to completion of charging, thermostat TH opens. That is, when a high level signal is applied to terminal 12a, charging control circuit 12 detects the open condition of thermostat TH, at step S8, switch element 14 is turned OFF, current flow to storage battery pack 50 is suspended, and charging is completed, at step S9.

Even if thermostat TH doesn't open due to a contact point defect or for some other reason, the battery charger 10 can complete charging by detecting the temperature via the thermistor Tr. Therefore, an overcharge at high temperature which may cause severe damage to the storage battery can be prevented.

Since, charge current flows through the thermostat TH to the storage batteries B, even if charging control circuit 12 or a thermistor Tr breaks down, when the temperature rises due to the full charge, thermostat TH opens to interrupt the charge. If storage battery temperature drops and the charging is started again due to the close of thermostat TH, the storage batteries B are not severely damaged, because the battery is not charged at an overheated condition.

Battery charger 10, according to the first embodiment of the invention, can charge a storage battery pack 50 having four terminals and having a built in thermistor Tr and thermostat TH. It can also charge previously known storage battery packs 450 having three terminals which have only a built in thermostat TH. Our battery charger 10 stops the flow of charging current based on the opening of thermostat TH of the battery packs 50 and 450.

Figure 6:
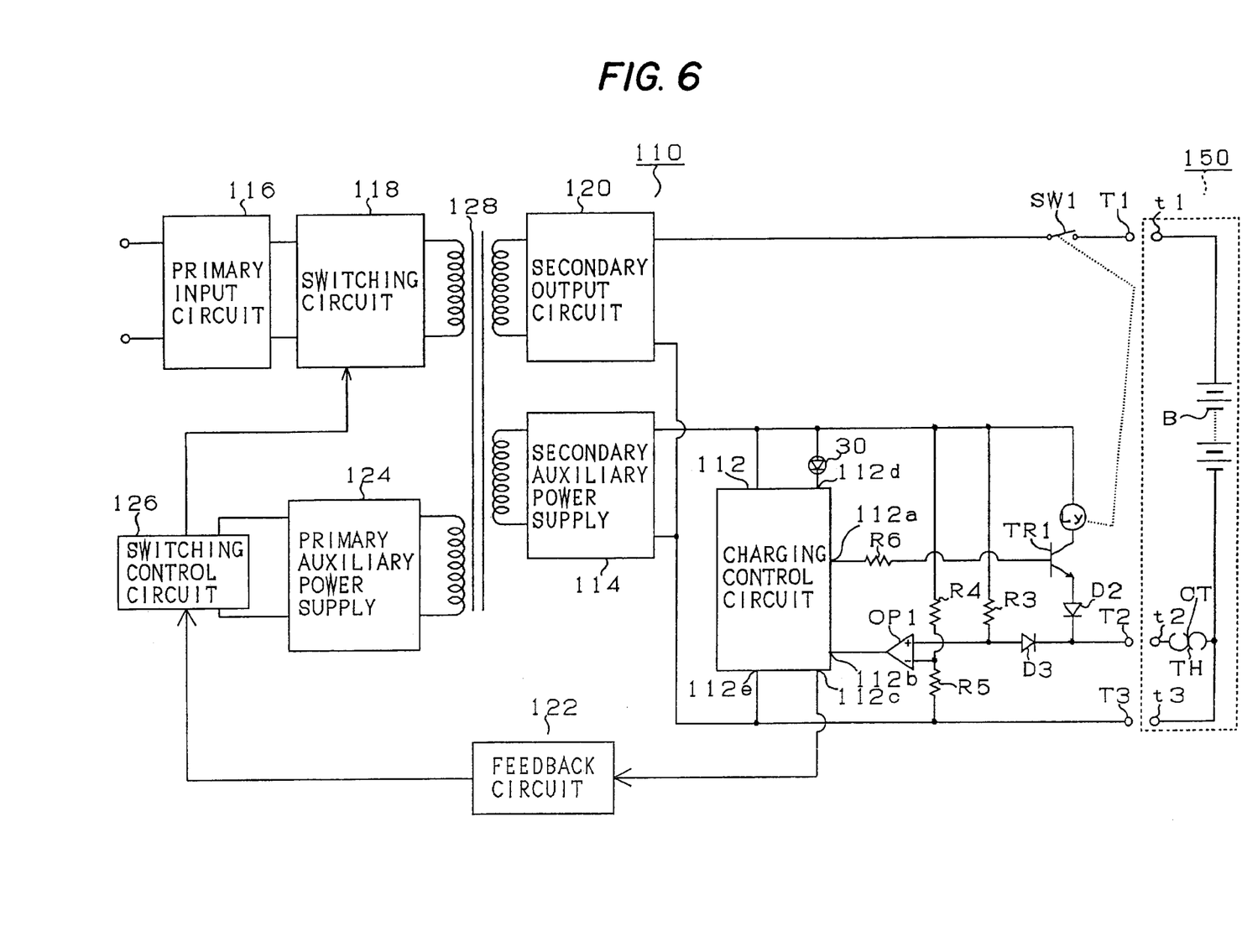
FIG. 6 is a schematic block diagram showing a battery charger and a storage battery pack according to a second embodiment.
Figure 9:
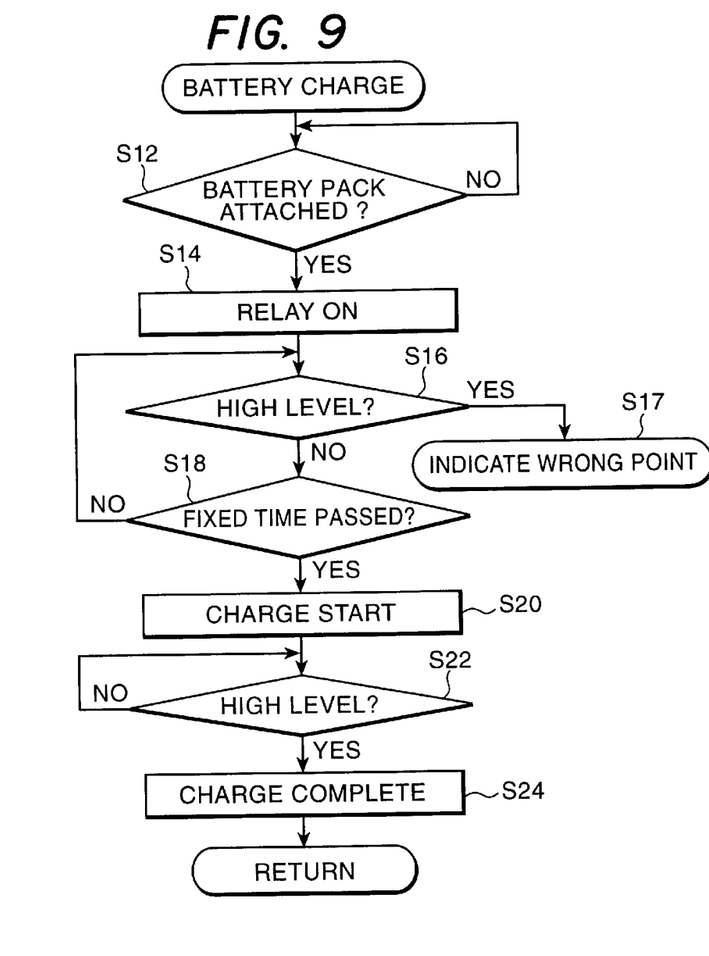
FIG. 9 is a flow chart showing an operation of a battery charger according to the second embodiment.

A battery charger according to a second embodiment of this invention will be explained with referring to FIG. 6 and FIG. 9.

The outward appearance of the battery charger and a storage battery pack according to the second embodiment is similar to that of the first embodiment. Therefore, detailed explanation thereof will not be made.

The arrangement of a battery charger 110 and a storage battery pack 150 according to the second embodiment of the invention will be explained with reference to FIG. 6.

Storage battery pack 150 has 8 storage batteries B which generate about 9.6V, and a thermostat TH which opens a contact CT when the temperature rises above a predetermined temperature at the completion of charging of storage batteries B. Storage battery pack 150 has an input terminal t1 connected to a positive terminal of storage batteries B, an input terminal t3 connected to a negative terminal of batteries B, and an input terminal t2 connected to the negative terminal of batteries B through thermostat TH.

Battery charger 110 includes circuits for controlling a flow of charging current to storage battery pack 150. A primary input circuit 116 rectifies commercial electric power into direct current. A switching circuit 118 turns on and off electric power from input circuit 116. A secondary output circuit 120 receives electric power from the switching circuit 118 through a transformer 128 and applies the power to an output terminal T1 and an output terminal T3 to charge the storage battery pack 150.

A switching control circuit 126 turns switching circuit 118 ON and OFF. A primary auxiliary power supply 124 supplies power to switching control circuit 126. A charging control circuit 112 monitors the condition of thermostat TH and detects completion of charging. A secondary auxiliary power supply 114 supplies power to charging control circuit 112 and to a feedback circuit 122 which operates switching control circuit 126 based on an output from charging control circuit 112.

A switch SW1 is closed and opened by a relay Ly installed between secondary output circuit 120 and output terminal T1. Relay Ly is driven by a transistor TR1. A control signal from output terminal 112a of the charging control circuit 112 is applied to a base of transistor TR1 through a resistor R6. An emitter of transistor TR1 is connected to an output terminal T2 through a diode D2. Output terminal T2 may contact with input terminal t2 connected to the thermostat TH of storage battery pack 150. When transistor TR1 is turned on, current which drives relay Ly flows through thermostat TH through diode D2 to input terminal t3. Output terminal T2 is connected to a non-inverting input terminal of an operational amplifier OP1 through a diode D3. One side of a resistor R3 is connected to the junction of diode D3 with the non-inverting input terminal of operational amplifier OP1. A inverting input terminal of operational amplifier OP1 is receives a standard electric potential or threshold level which is divided by resistors R5 and R4. An output of operational amplifier OP1 is applied to an input terminal 112b of the charging control circuit 112.

Before charging is starts, charging control circuit 112 determines the condition of thermostat TH of the storage battery pack 150 based on whether the resistance value thereof is low. As the performance of thermostat TH deteriorates, the temperature at which thermostat TH becomes open rises, and the resistance value increases. Thus, the charging control circuit 112 determines whether thermostat TH can't appropriately open based on the resistance value, for example, when a degraded thermostat TH opens at 80° C., rather than at 60° C.

First, the charging control circuit 112 sends a control signal from its output terminal 112a which turns on transistor TR1, and closes switch SW1 by driving relay Ly. At this moment, charging hasn't started because charge voltage from the output circuit 120 isn't applied to output terminal T1. When transistor TR1 turns ON, a relative large current for driving relay Ly flows through thermostat TH.

When thermostat TH is in good condition and has a low resistance (less than a predetermined number of ohms), a relatively low voltage signal resulting from a divider formed by resistor R3 and the resistance of the thermostat TH is applied to the non-inverting input terminal of operational amplifier OP1. Operational amplifier OP1 compares this input with the voltage at its inverting input, and outputs a low level to charging control circuit 112. Thus, the charging control circuit 112 regards thermostat TH as good. In this case, the charging control circuit 112 sends a signal from its output terminal 112c to feedback circuit 122, which causes operation of switching circuit 118 through switching control circuit 126, and applies the charge voltage to output terminal T1 and output terminal T3 from output circuit 120, and starts the charging of storage battery pack 150.

In the case where the thermostat TH is defective and has a high resistance (above a predetermined ohmic level), a relatively high voltage, divided by resistance R3 and thermostat TH is applied to the non-inverting input terminal of the operational amplifier OP1. The operational amplifier OP1 compares the input with the voltage at its inverting input terminal and outputs a high level signal to charging control circuit 112. Thus control circuit 112 regards thermostat TH as being defective, turns on LED lamp 30 by reversing a level of output terminal 112d to low, and indicates the defect of the thermostat TH of the storage battery pack 150. In this case, the charging of the storage battery pack 150 isn't started.

When thermostat TH opens due to the heat caused by completion of charging of storage batteries B, after the charge was started accordance with thermostat TH being regarded as good, the relatively high voltage signal due to the open condition of thermostat TH is applied to the non-inverting input terminal of the operational amplifier OP1, in the same way as the above-mentioned trouble detection. Thus, operational amplifier OP1 outputs the high level signal to this charging control circuit 112. Accordingly, the charging control circuit 112 determines that charging is completed, stops the signal which is sent from output terminal 112c to the feedback circuit 122, and stops application of the charging voltage from the output circuit 120 to complete the charging of the storage battery pack 150.

The determination of the condition of thermostat TH and the charging operation of charging control circuit 112 will be explained with reference to a flow chart in FIG. 9. At step S12, charging control circuit 112 watches whether storage battery pack 150 is attached into battery charger 110. If the charger 110 is attached, control circuit 112 turns on transistor TR1 to flow relay current to thermostat TH, in order to determine the condition of the thermostat TH, at step S14. The charging control circuit 112 watches for a high level signal from the operational amplifier OP1 due to a defective thermostat TH, at step S16. If a high level is detected, charging control circuit 112 turns on LED lamp 30, indicating a defective storage battery pack 150, and does not start the charging, at step S17.

When thermostat TH is in good condition, a low level signal is input from operational amplifier OP1 and the charging control circuit 112 waits for a predetermined time (for example, 30 seconds), at step S18. When this predetermined time passed, charging control circuit 112 starts charging, at step S20. Charging control circuit 112 detects the high level signal input from operational amplifier OP1 due to the open condition of thermostat TH caused by the heat due to the completion of charging of the storage batteries B, at step S22. When a high level signal is input, charging control circuit 112 regards the charge as being completed, stops application of the voltage to storage battery pack 150 and completes charging, at step S24.

In the known battery charger using a thermostat, when the thermostat does not surely "open" or an open temperature shifts to the high temperature, the charging of batteries B can't be suspended properly. In the battery charger according to this second embodiment, since a breakdown of thermostat TH, which can not be detected after charging has been started, is detected before charging starts, it prevented the situation in which charging can't be stopped due to the defective thermostat.

Further, in battery charger 110 according to this second embodiment, since the quality of the thermostat TH is determined by operational amplifier OP1 which detects the completion of charging, before charging starts, the decision regarding the quality of thermostat TH can be simply carried out.

In battery charger 110, according to this second embodiment, by flowing comparatively large current via relay Ly to the thermostat TH, a defect thereof is detected when the change of the resistance value is not so big. For this substitute, by setting up a low voltage at the inverting input terminal of the operational amplifier OP1, in the same way, it is possible to detect a defective thermostat TH when the change of the resistance value thereof is not big.

Figure 7:
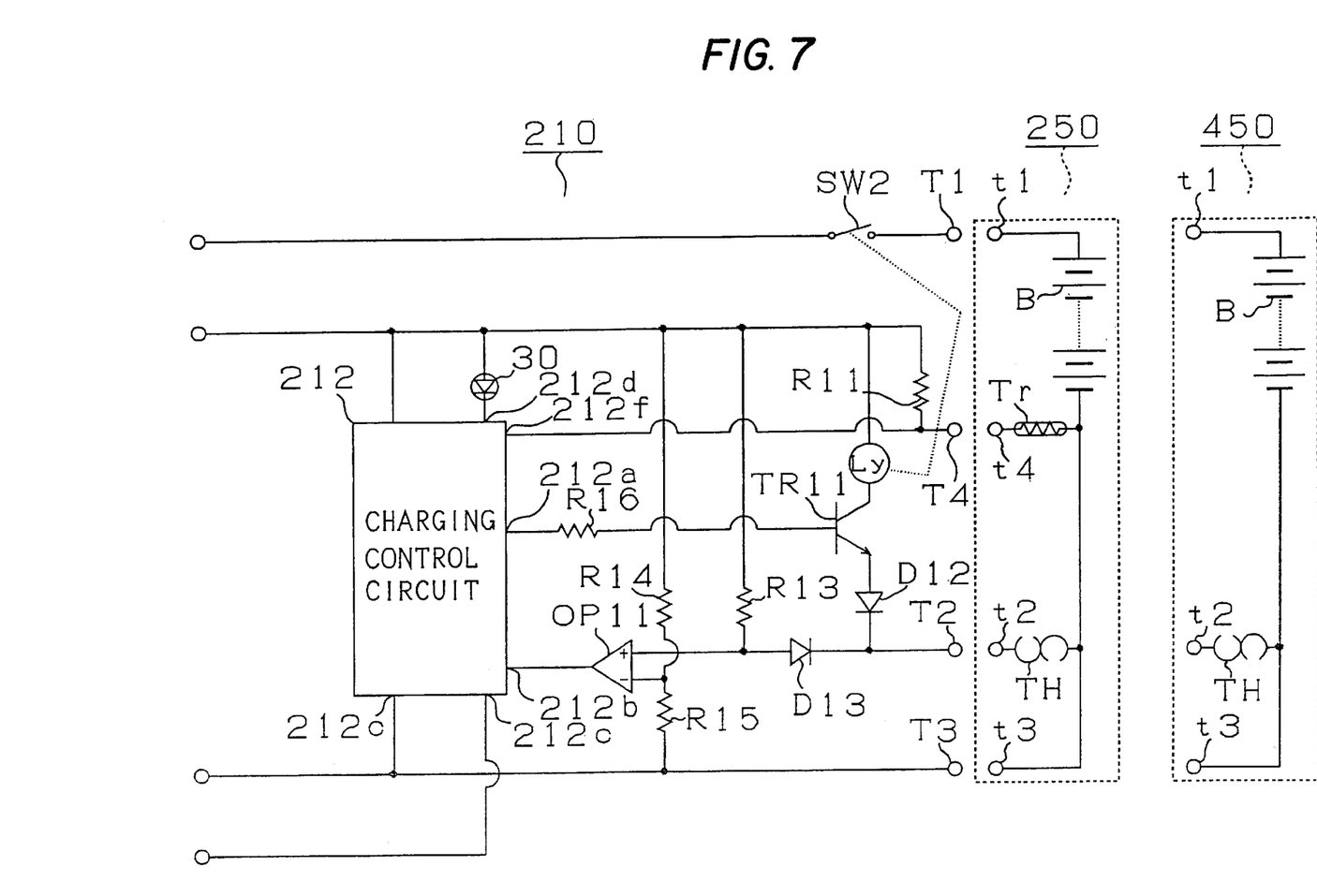
FIG. 7 is a schematic block diagram showing a battery charger and a storage battery pack according to a third embodiment.
Figure 10:
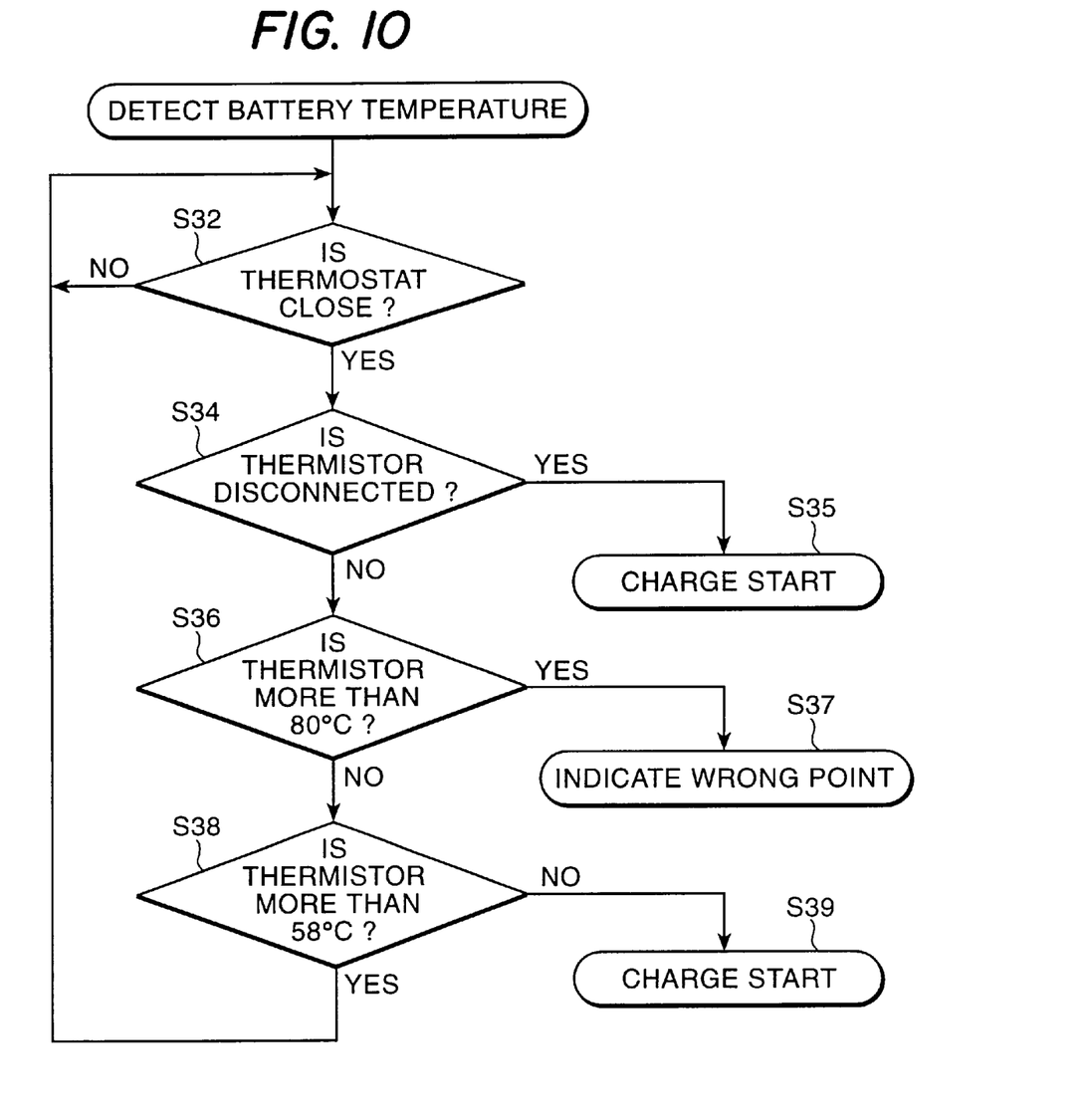
FIG. 10 is a flow chart showing an operation of a battery charger according to the third embodiment.

A battery charger according to the third embodiment of this invention will be explained with referring to FIG. 7 and FIG. 10.

The outward appearance of the battery charger and storage battery pack according to the third embodiment is similar to that of the first embodiment. Therefore detailed explanation thereof will be omitted.

Construction of a battery charger 210 according to the third embodiment will be explained with referring to FIG. 7.

Components in the battery charger 210 which resemble to the components of the battery charger according to the second embodiment are referred by similar numerals, and hence explanation thereof will be omitted.

The storage battery pack 250 according to the third embodiment has a thermostat TH and a thermistor Tr in the same way as the above-described storage battery pack 50 in accordance with the first embodiment. Storage battery pack 250 has an operational amplifier OP11 which detects the quality of the thermostat TH and the open/closed condition of thermostat TH in the same way as in the second embodiment.

The temperature of the thermostat TH of the storage battery pack 250 connected to output terminal T4 can be monitored via input terminal 212f of charging control circuit 212, by dividing a resistance value of the thermistor Tr through resistance R11.

When thermostat TH does not open at a temperature higher than a predetermined temperature at which thermostat TH should open, battery charger 210 indicates the defect of thermostat TH by lighting LED 30. High temperature detection is carried out by using thermistor Tr.

The process carried out by charging control circuit 212 will be explained with referring to FIG. 10. Charging control circuit 212 monitors the condition of thermostat TH by flowing the relay current before the charging starts, in the same way as in the second embodiment, and therefore detailed explanation thereof will be emitted.

At step S32, the charging control circuit 212 determines whether thermostat TH is closed. For example, when storage battery pack 250 used in the electromotive drill 70 shown in FIG. 4 the capacity of which is decreased rapidly by a continuous use, the temperature thereof rises to more than 60° C. If charging takes place during high temperature, the lifetime of the batteries may shorten. To prevent charging under high temperature, thermostat TH opens until the temperature of the battery falls. When storage battery pack 250 is at a low temperature and the thermostat is closed, charging control circuit 212 determines whether the thermostat TH of the storage battery pack 250 is disconnected, at step S34. If the existing storage battery pack 450 having three terminals of shown in FIG. 7 was attached into the battery charger 210, since the existing pack 450 doesn't have a terminal for the thermistor Tr, thermistor Tr is disconnected and charging is started, at step S35.

When thermistor Tr is not disconnected, charging control circuit 212 determines whether the temperature of the thermistor Tr is more than 80° C., at step S36. When the temperature of the thermistor Tr is more than 80° C., thermostat TH is regarded as being broken down because the thermostat TH closes at a temperature at which the thermostat TH should be "open". The charging control circuit 212 indicates a defect of storage battery pack 250 in which the thermostat TH is built by turning on LED lamp 30, at step S37.

On the other hand, when the temperature of the thermistor Tr is less than 80° C., the control circuit 212 determines whether a thermistor Tr is less than 58° C., at step S38. When the temperature of thermostat TH is more than 58° C., control circuit 212 stands by until the temperature of the storage batteries B falls. When the temperature of the thermostat TH is less than 58° C., charging is started, at step S39. Then, as explained with reference to the flow chart of FIG. 8, charging is completed by the high temperature detection of the thermostat TH or the thermostat TH.

In this third embodiment, a battery charger of which the type does not flow the charge current via the thermostat has been illustrated. The configuration accordance with the third embodiment, however, can be adapted to a battery charger which flows charging current via a thermostat.

Charging under high temperature which may shorten the lifetime the batteries can be avoided, even if thermostat TH is defective. Moreover, battery charger 210 can charge not only the storage battery pack 250 accordance with the third embodiment but also the existing storage battery pack 450 having three terminals.

When a thermostat is short-circuited or a movement temperature thereof rises, the thermostat of the battery can not stop the charge. When battery charger 210 according to the third embodiment and the existing battery charger 410 shown in FIG. 11 are simultaneously used, the battery charger 210 independently indicates the storage battery pack 250 of which a thermostat is defective.

Although the invention has been disclosed in the context of a certain preferred embodiments, it will be understood that the present invention extends beyond the specifically disclosed embodiments to other alternative embodiments of the invention. Thus it is intended that the scope of the invention should not be limited by the disclosed embodiments, but should be determined by reference to the claims that follow.

What is claimed is:

1. A battery charging system, comprising:
   a first battery pack including:
      a battery to be charged;
      a thermistor for sensing a temperature of the battery,
      a thermostat having a switch contact that can be open or closed, the switch contact being open when the temperature of the battery is above a predetermined temperature;
      a first terminal connected to a first electrode of the battery,
      a second terminal connected to a second electrode of the battery,
      a third terminal connected to the second electrode of the battery through the thermostat, and
      a fourth terminal connected to the second electrode of the battery through the thermistor;
   a second battery pack, including:
      a battery to be charged;
      a thermostat having a switch contact that can be open or closed, the switch contact being open when the temperature of the battery is above a predetermined temperature;
      a first terminal connected to a first electrode of the battery,
      a second terminal connected to a second electrode of the battery, and
      a third terminal connected to the second electrode of the battery through the thermostat; and
   a charging unit, including:
      charging control means for flowing a battery charging current between the first terminal and the third terminal of the the first battery pack or the second battery pack,
      the charging control means being arranged such that
         when charging control means charges the first battery pack, the control means stops the flow of charging current when the switch contact of the thermostat is open, or based on a change of resistance value of the thermistor responsive to the battery temperature being above a second predetermined temperature, and
         when the charging control means chargers the second battery pack, the control means stops the flow of charging current when the switch contact of the thermostat is open.

2. A battery charger comprising:
   a battery pack comprising:
      a battery;
      a temperature sensor for sensing a temperature of said battery;
      a temperature switch capable of being open or closed and adapted to be open when a temperature of said battery is above a first predetermined temperature; and
   a charging unit comprising:
      means for indicating a problem condition when said temperature switch is closed and said temperature sensor determines that the temperature of said battery is above a second predetermined temperature; and
      charging control means for initializing a charging current to flow to said battery pack when said temperature switch is closed and said temperature sensor indicates that said battery pack is at a safe temperature for charging.

3. A battery charger for charging battery packs of first and second types,
   the first type of battery pack including:
      a battery to be charged;
      a thermistor for sensing a temperature of the battery,
      a thermostat having a switch contact that can be open or closed, the switch contact being open when the temperature of the battery is above a predetermined temperature;

a first terminal connected to a first electrode of the battery, a second terminal connected to a second electrode of the battery, a third terminal connected to the second electrode of the battery through the thermostat, and a fourth terminal connected to the second electrode of the battery through the themistor;

the second type of battery pack including:

a battery to be charged;

a thermostat having a switch contact that can be open or closed, the switch contact being open when the temperature of the battery is above a predetermined temperature;

a first terminal connected to a first electrode of the battery, a second terminal connected to a second electrode of the battery, and a third terminal connected to the second electrode of the battery through the thermostat;

the batter charger, comprising:

charging control means for flowing a battery charging current between the first terminal and the third terminal of the first or second type of battery pack, the charging control means being arranged such that when the charging control means charges a battery pack of the first type, the control means stops the flow of charging current when the switch contact of the thermostat is open, or based on a change of resistance value of the thermistor responsive to the battery temperature being above a predetermined temperature, and when the charging control means charges a battery pack of the second type, the control mans stops the flow of charging current when the switch contact of the thermostat is open.

* * * * *